May 17, 1955

D. PARRETT 2,708,497

CLUTCH RELEASE AND OPERATING MECHANISM

Filed Oct. 16, 1952

INVENTOR.
Dent Parrett
BY Robert Cobb
Attorneys

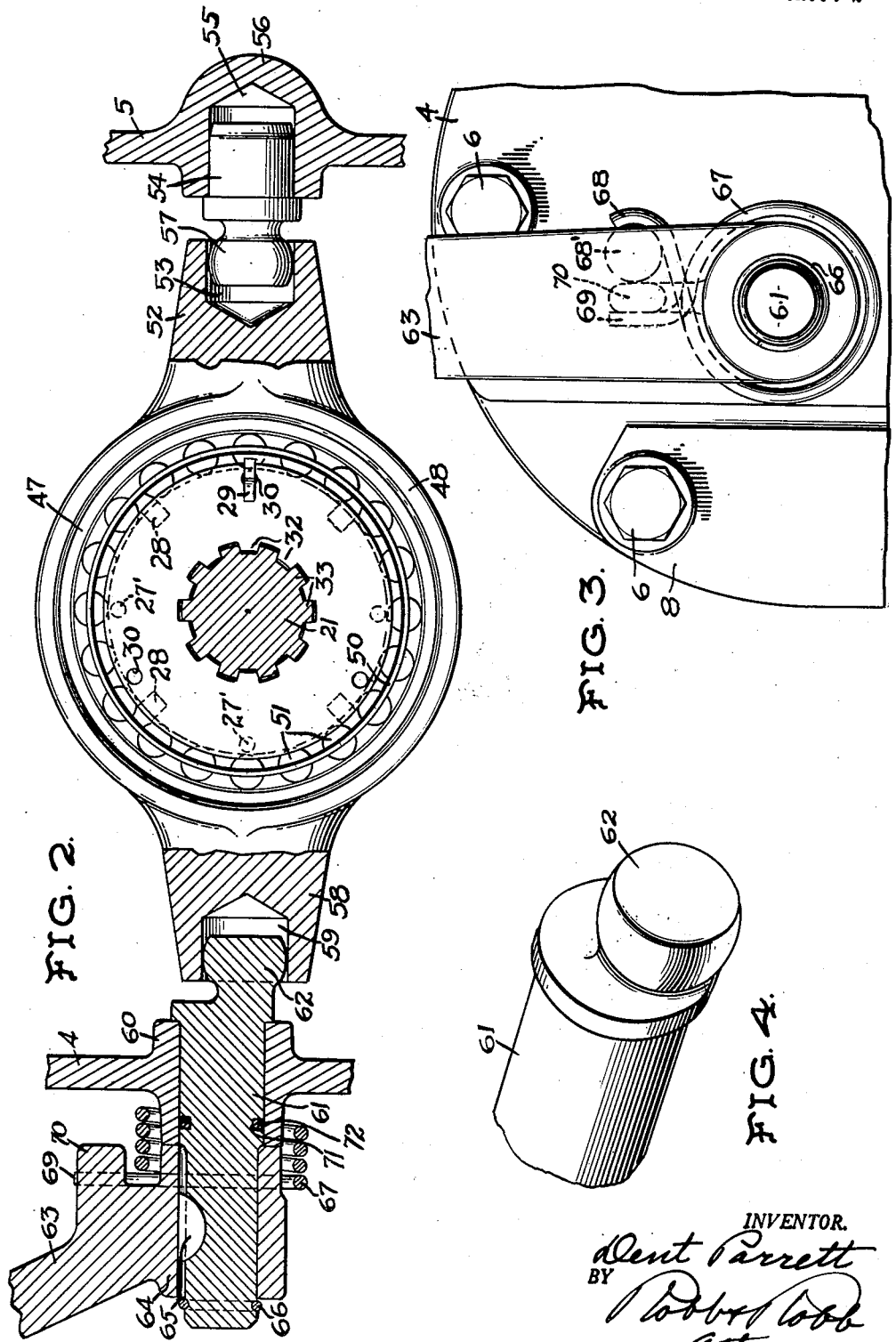

United States Patent Office 2,708,497
Patented May 17, 1955

2,708,497

CLUTCH RELEASE AND OPERATING MECHANISM

Dent Parrett, St. Joseph, Mich., assignor, by mesne assignments, to Lambert Brake Corporation, St. Joseph, Mich., a corporation of Michigan Application October 16, 1952, Serial No. 315,043

5 Claims. (Cl. 192—98)

The present invention relates to an improved clutch release mechanism, and more particularly to a release mechanism for normally engaged, spring loaded clutches.

Recently, clutches of a very small size but having an extremely high torque capacity have been developed for installation in the conventional change speed gear transmission of farm tractors so as to provide an auxiliary clutch to control the drive for the power take-off shaft of such tractors, which renders auxiliary farm equipment continuously operable, while allowing interruption of the drive to the traction wheels of the tractor. These clutches heretofore, however, have been associated with release or throw-out mechanisms which occupy considerable space in addition to that occupied by the clutch proper.

Obviously, the space limitations in a conventional transmission housing of a tractor are such that it is extremely difficult to produce a clutch and release mechanism which may be installed in the transmission system without requiring any substantial alteration of the transmission system itself or the housing therefor. In some types of commercially successful farm tractors, for example, the problems of space limitation have heretofore made it impractical to include an auxiliary clutch of the aforesaid type due to the fact that adaptation of the transmission housings thereof for this purpose would require major redesign, involving costly re-tooling and an accompanying major increase in price.

It is a primary object of this invention to provide an improved clutch release mechanism which is adapted to be associated with the aforementioned type of clutch.

Another object is to provide a clutch release mechanism which is simple in construction, very compact in form and readily adaptable to transmission housings and systems without necessitating major changes in transmission design.

Specifically, an object is to provide a release mechanism embodying an axially shiftable member adapted to be operatively connected to the shiftable pressure plate or primary disc of a clutch, a release collar concentrically disposed about the axially shiftable member and pivotally mounted at one of its sides, a self-aligning bearing assembly having an outer race secured to the release collar and an inner race secured to the axially shiftable member with a number of roller elements disposed between said bearing races, the roller elements and contacting faces of the races being so formed as to transmit axial shifting movements to the axially shiftable member responsive to pivotal movements of the release collar without overloading the bearing assembly, and operating means for the release collar comprising a rotatable shaft having an eccentrically disposed end portion engaged with the side of the release collar opposite its pivotal mounting aforesaid, and a lever connected to said shaft for rotating the same. In this type of construction, the self-aligning bearing assembly absorbs the angular displacement of the release collar relative to the axially shiftable member and the clutch proper, while maintaining a high mechanical ratio between the parts.

Still another object is to provide a clutch release mechanism that may be readily and simply adapted to many and diverse types of clutches, particularly to clutches which are utilized in equipment wherein there are definite space limitations governing the size of the entire clutch and release mechanism.

Other and further objects and advantages of the invention will be hereinafter described or will become apparent in the following detailed description of one illustrative embodiment thereof depicted in the accompanying drawings.

In the drawings:

Fig. 1 is a view, partly in top plan and partly in section, of a portion of a conventional transmission assembly of a well-known farm tractor, with the top of the housing broken away to reveal a small clutch of a known form and the novel release mechanism of this invention in association with the clutch, the clutch and release mechanism being shown in horizontal section, and one closure plate for the housing being broken away, the other closure plate being shown in top plan, with a portion of the operating lever for the release mechanism broken away;

Fig. 2 is an enlarged view in transverse section, as taken on the line 2—2 of Fig. 1, looking in the direction of the arrows, certain of the parts being shown in elevation;

Fig. 3 is an enlarged fragmentary view in side elevation of a portion of the left-hand closure plate of Fig. 1, showing the operating lever and its mounting; and Fig. 4 is an enlarged, fragmentary view in perspective of the rotatable operating shaft for the release mechanism, and particularly showing the eccentric relation of the end of the shaft to the shaft body.

Figure 1:
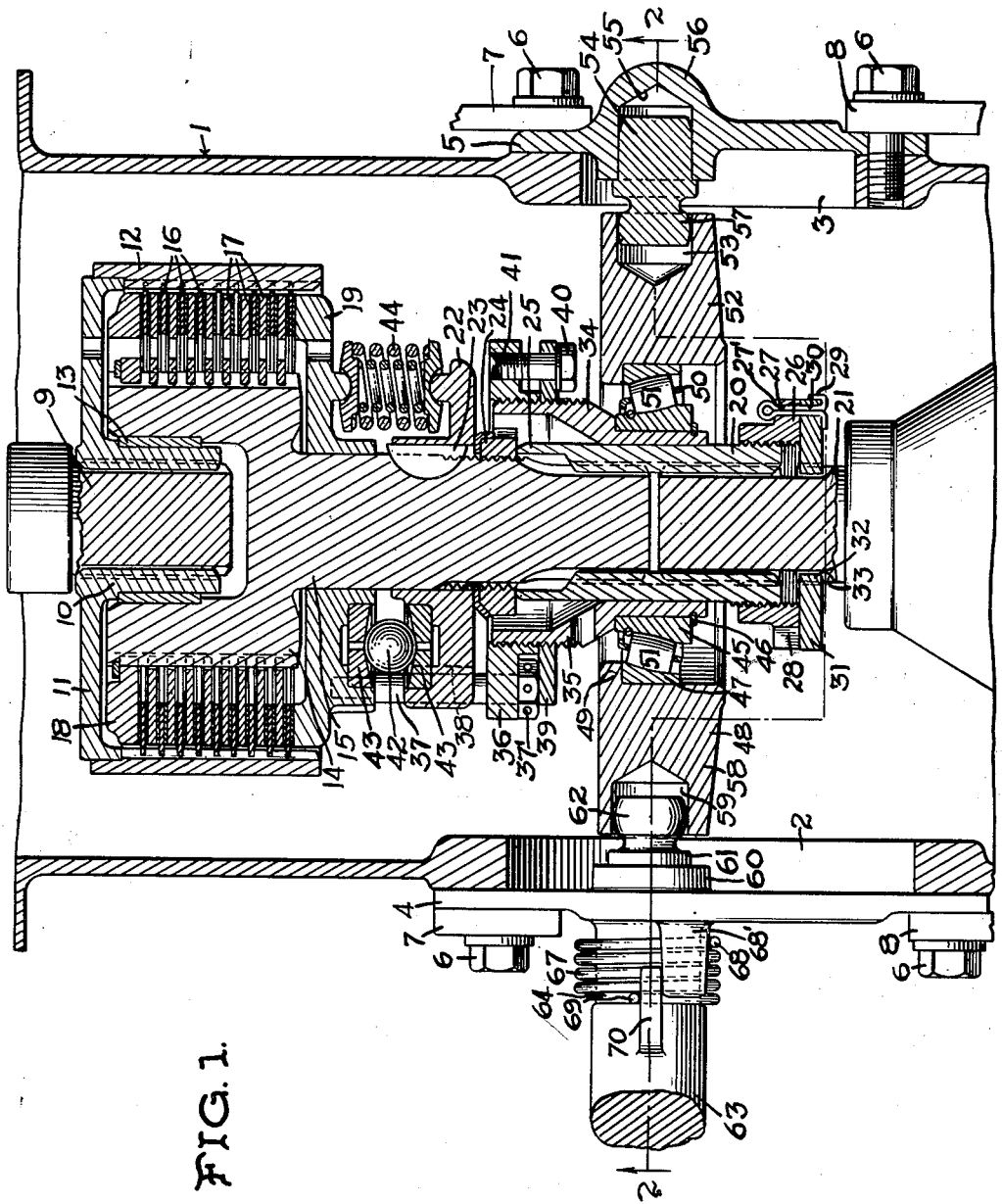

Like reference characters in the several views of the drawings and in the following description designate corresponding parts, wherein 1 generally denotes a housing of a conventional transmission mechanism as now utilized on a widely known and used farm tractor. The opposite sides of the housing 1 are formed with a pair of openings 2 and 3, and these openings are closed by plates 4 and 5, respectively. The plates 4 and 5 are usually secured to the housing 1 by means of a number of screw fasteners 6, and clamped between the heads of the screws 6 and the plates 2 and 3 and towards the front end of the housing 1 is a pair of brackets 7 which are utilized to support the conventional foot rests (not shown) for the operator of the tractor. Towards the rear end of the housing 1 there is a pair of small plates 8 secured between the heads of certain of the screws 6 and the closure plates 2 and 3, these plates 8 being conventionally adapted to be engaged by a pivotal dog (not shown) carried by the conventional brake operating mechanism of the tractor (not shown) to lock the tractor brakes on. These details are not material to the present invention and therefore need not be further described.

Extending into the housing 1 from one end thereof is a transmission shaft 9 for the transmission gearing. Splined on the end of the shaft 9 so as to rotate therewith is a splined hub 10 of a power plate 11, and suitably secured to the outer marginal edge of the power plate 11 is a cylindrical sleeve or housing 12. Journaled on the hub 10 by means of a bearing 13 is an enlarged terminal hub 14 of a clutch shaft 15 which extends axially rearwardly. The opposed faces of the shell 12 and the hub 14 are each suitably splined to receive complemental splines on a pack of inter-leaved friction elements or discs 16 and 17, the discs 16 being splined to the shell 12 and the discs 17 being splined to the hub 14 for rotation with and for axial sliding movements relative to said shell and hub. The hub also has a stationary pressure plate or flange 18 secured thereto for rotation therewith, and slidably and rotatably mounted on the clutch shaft 15 is a shiftable pressure plate or primary actuating disc 19 which is adapted to be shifted axially towards the relatively stationary plate 18 to shift the friction discs 16 and 17 into frictional engagement with each other and up against the plate 18. When the discs 16 and 17 are so engaged, power will be transmitted from shaft 9 through power plate 11, shell 12 and friction discs 16, and thence through friction discs 17 to the clutch shaft 15. The rear end of clutch shaft 15 is suitably splined to receive one end of a slack adjuster sleeve 20 which is interiorly splined for engagement with the clutch shaft 15 and with an end of a shaft 21, whereby power or torque transmitted to the clutch shaft 15 is transmitted to the traction wheels (not shown) of a tractor vehicle or the like.

In the illustrated clutch, a relatively stationary plate or secondary actuating disc 22 is keyed on the clutch shaft 15, as by means of a Woodruff key 23. A lock nut and washer assembly 24 holds the secondary disc 22 against rearward movement on shaft 15, and this nut 24 may be adjusted on the shaft 15 to effect adjustment of the clutch, if necessary.

In order to eliminate end play of the clutch between shafts 9 and 21, the aforementioned slack adjuster sleeve 20 has one of its ends 25 engaged with the lock nut assembly 24, and the other end of the sleeve 20 is threaded so as to receive an interiorly threaded lock-nut 26. The lock-nut 26 has a radially extended flange 27 provided with a suitable number of recesses 28 which are adapted to receive a suitable tool for turning the nut 26. Through the flange 27 are a plurality of openings 27' through which a suitable member, such as a cotter pin 29 or the like may pass, this cotter pin being selectively engageable in one of a number of openings 30 through a thrust washer 31 so as to lock the nut 27 in a selected adjusted position, with the thrust washer engaged about its inner splined periphery 32 with short splines 33 on the shaft 21 and thrust up against the ends of the grooves between the splines 33. Thus, slack or end play between the clutch shaft 15 and the output shaft 21 is eliminated.

Freely mounted on the slack adjuster sleeve 20 is an axially shiftable release sleeve or member 34 having an enlarged or belled, exteriorly threaded end 35. Threaded on the end 35 of this release sleeve is an annular release flange 36. A suitable number of shoulder bolts 37 interconnect the release flange 36 with the primary disc 19, the outer margin of the secondary disc 22 being suitably formed so as to provide clearance space 38 for the shoulder bolts 37. An annular retainer ring 39 is also threaded on the end 35 of release sleeve 34 and is adapted to retain the shoulder bolts 37 in place by holding the head 37' of each bolt against the release flange 36. A suitable number of headed studs 40 extend through the ring 39 and threadedly engage in a like number of openings 41 in the flange 36 so as to lock the ring 39 to the flange 36.

Disposed between the primary actuator disc 19 and the secondary actuator disc 22 is a plurality of energizing balls 42, these balls preferably being seated in a pair of opposed inserts 43, 43 having conical seats therein; and also disposed between these actuator discs is a plurality of clutch engaging spring assemblies 44. These balls and spring assemblies are preferably equi-distantly spaced about the axis of the clutch in alternate relation.

The operation of the clutch is such that power or torque is transmitted from the shaft 9 through the power plate 11 and the housing sleeve 12 to the friction discs 16, and since the primary disc normally maintains the discs 16 shifted into engagement with the intermediate discs 17 by the action of the springs 44, the torque is thus transmitted to the clutch shaft 15. Load on the clutch in excess of its spring-loaded capacity will tend to cause the clutch shaft 15 to lag slightly, with resultant tendency of the friction discs to slip. However, the secondary actuator disc 22 which is keyed on the shaft 15 will lag slightly therewith, while the primary disc 19 which is freely rotatable on the shaft 15 will be carried along with the power input shaft 9 and the splined power plate 11 and sleeve 12, by reason of the fact that it is in frictional contact with one of the friction discs 16 that are splined to the housing 12. Thus, a slight relative rotation will occur between the primary and secondary discs 19, 22, which relative rotation will cause the balls 42 to ride up the inclined faces of the conical seats in the inserts 43, with an attendant positive and powerful camming action. This camming action of the balls forces the friction discs 16 and 17 into engagement with each other with a tremendous force, so that slippage of the discs is virtually impossible, with the result that the clutch has an extremely high torque capacity for its size.

In order to disengage the clutch, the primary disc 19 must be shifted axially toward the secondary disc 22, against the force of the springs 44, and this is done by shifting the release sleeve 34 axially away from the clutch proper.

According to the primary objectives of this invention, I provide a mechanism for effecting the aforesaid axial shifting movement of the release member 34 which is extremely compact and simple. This release mechanism comprises a self-aligning release bearing assembly, the inner race or cone 45 of which is seated on the release member 34 and secured thereon by means of a snap ring 46 fitting in a suitable annular groove in the outer periphery of the member 34. An outer bearing race or cup 47 is seated about the inner periphery of a pivotal release collar 48, the collar 48 being provided with a shoulder 49 for positioning the bearing cup 47. Interposed between the cone 45 and the cup 47 is a carrier 50 having a plurality of roller bearings 51 rotatably mounted therein.

Each roller bearing 51 is formed so as to have its race-contacting surface arched longitudinally, and the contiguous faces of the races 45 and 47 are likewise arched. In addition to having their contacting faces arched, the central axes of the rollers 51 and the operative faces of the races 45 and 47 are disposed at an angle converging toward the clutch proper, whereby pivotal movement of the release collar, with resultant cocking of the outer race 47, will impart axial movement to the inner race 45, the arcuate and angular relation of the bearing parts compensating for such angular displacement of the parts without overloading the bearing assembly.

In order to mount the release collar 48 for pivotal movement, the collar 48 is laterally extended to provide a supporting arm or extension 52 having a socket 53 in the outer end thereof. A stud or pivot pin having a cylindrical shank 54 is suitably mounted, as by a tight press fit, in a socket 55 in an enlarged portion 56 of the closure plate 5. The free end 57 of the stud 54 is suitably formed so as to provide a rounded annular bearing surface, and this end 57 projects into the socket 53 of the collar 48.

The side of the collar 48 opposite the supporting extension 52 is likewise extended laterally to provide an arm 58 having a socket 59 in the end thereof. The closure plate 4 is provided with a bearing support 60 through which extends a short rotatable or rockable shaft 61 having an eccentrically disposed end extension 62. This eccentric 62 projects into the socket 59 in the extension 58 of collar 48, and is suitably formed so as to provide a rounded annular surface for engagement with the inner periphery of the socket 59, whereby friction between these surfaces is reduced to a minimum. Thus rocking movement of the shaft 61 will cause the release collar to pivot on the end 57 of the stud 54.

In order to rock the shaft 61, a lever 63 is provided, this lever having an enlarged, bored end 64 mounted on the outer end of the shaft 61 and suitably keyed thereto, as by means of a Woodruff key 65, or the like, whereby rocking movements of the lever 63 will be transmitted to the shaft 61. A snap ring 66 or other suitable means is utilized to maintain the lever 63 on the shaft 61 with the portion 64 of the lever preferably in abutting contact with the extended bearing portion 60 of the plate 4.

A torsion spring 67 is disposed about the bearing support 60 and the adjacent portion of the end 64 of the lever 63, this spring having one offset end 68 engaged with an outstanding stop lug 68' formed on the outer side of the plate 4, and the other end 69 of said spring being offset and engaged with a stop projection 70 on the lever 63. The spring 67 thus normally maintains the stops 68' and 70 in engagement with each other, and in this position, the eccentric 62 on shaft 61 is in such a position that the release collar 48 is in a common plane with the pivot pin 54 and the rotatable shaft 61, and the clutch springs 44 and the balls 42 will maintain the clutch in engagement. In other words, the normal position of the clutch release lever and mechanism is one in which the clutch is engaged.

In view of the fact that the housing 1 of a tractor transmission contains lubricating oil for the transmission gearing, the clutch assembly may be so constructed as to operate in a wet condition as is the clutch shown herein, with the transmission oil flowing freely between all of the parts thereof, but if preferred for certain other conditions or installations, it may be suitably sealed so as to operate dry. In any case, the shaft 61 is preferably provided with a peripheral groove 71 in which is seated an O-ring seal 72 which prevents oil leakage along the shaft 61. Moreover, the release mechanism itself will be constantly lubricated by the transmission oil, thus rendering the release assembly serviceable for prolonged periods of time, without need for service or repair due to wear caused by lack of lubrication.

In use, when it is desired to release the clutch, the lever 63 is rocked in a counter-clockwise direction as viewed in Fig. 3, with resultant movement of the eccentric 62 in an arc away from the clutch proper. Thus, the release collar 48 will pivot on the end 57 of stud 54, and the self-aligning structure of the release bearing assembly will effect axial movement of the release member 34 in a direction away from the clutch proper. Such axial movement of the member 34 will pull the primary disc 19 towards the secondary disc 22 and thereby release the frictional engagement of the friction discs. Since the clutch release springs 44 and the torsion spring 67 are constantly urging the clutch and clutch release parts in a direction to engage the clutch, re-engagement thereof is accomplished by merely releasing the clutch lever, which may be of any suitable form so as to be either hand or foot-operated, the lever 63 shown in the drawings being a hand lever.

While the specific structure of one illustrative embodiment has been herein shown and described in detail, the invention is not confined thereto, since changes and alterations may be resorted to without departing from the spirit thereof as defined in the appended claims.

I claim:

1. Operating mechanism of the class described, comprising an axially shiftable member, a pivotal member disposed about said axially shiftable member, means interposed between said members for shifting said axially shiftable member responsive to pivotal movement of said pivotal member, and means for imparting pivotal movements to said pivotal member, the first-named means comprising an anti-friction bearing, said anti-friction bearing comprising an inner race carried by said axially shiftable member, an outer race carried by said pivotal member, and a plurality of rollers disposed intermediate said inner and outer races, the opposing faces of said inner and outer races being disposed at an angle to the axis of said axially shiftable member, said race faces being longitudinally arched in opposite directions, and said rollers being longitudinally arched complementary to said opposed race faces.

2. Operating mechanism of the class described, comprising supporting means, said supporting means including a pair of opposed supporting plates, a rotatable member extending through one of said plates, a pivot element carried by the other plate in axially spaced relation to said rotatable member, a collar member pivotally mounted at one of its sides on said pivot element, the other side of said collar member being engaged with the rotary member, one of said members having a socket therein and the other of said members having a part projecting into said socket, said socket and projecting part being disposed eccentrically relative to the axis of said rotatable member, said collar member having a central opening therethrough, an axially shiftable member disposed in the central opening of said collar member, and a self-aligning bearing assembly interposed between said collar member and said axially shiftable member to shift said axially shiftable member responsive to rotation of said rotatable member and attendant pivotal movement of said collar member, said bearing assembly including a pair of relatively rotatably and angularly shiftable parts, one of said parts being fixed to said collar for pivotal movement with said collar, and the other of said parts being fixed on said axially shiftable member for shifting the same axially responsive to pivotal movement of said collar.

3. A friction device comprising a pair of relatively rotatable members, a plurality of friction elements adapted to be shifted into frictional engagement with each other, at least one of said friction elements being carried by one of said members and at least one of said friction elements being carried by the other of said members, a shiftable pressure plate for shifting said friction elements into engagement and allowing disengagement thereof, respectively, upon axial shifting movements of said pressure plate in directions towards and away from said friction elements, and means for shifting said pressure plate, the means for shifting said pressure plate in one direction comprising an axially shiftable member connected to said pressure plate and slidably mounted on one of said relatively rotatable members, a pivotal member disposed about said axially shiftable member, anti-friction bearing means interposed between said last-mentioned members for shifting the axially shiftable member responsive to pivotal movements of said pivotal member, said anti-friction bearing means comprising an inner race carried by said axially shiftable member, an outer race carried by said pivotal member, and a plurality of rollers disposed intermediate said inner and outer races, the opposing faces of said inner and outer races are disposed at an angle to the axis of said axially shiftable member, said race faces being longitudinally arched in opposite directions, and said rollers being longitudinally arched complementary to said opposed race faces and means for imparting pivotal movements to said pivotal member.

4. A friction device comprising a pair of relatively rotatable members, a plurality of friction elements adapted to be shifted into frictional engagement with each other, at least one of said friction elements being carried by one of said members and at least one of said friction elements being carried by the other of said members, a shiftable pressure plate for shifting said friction elements into engagement and allowing disengagement thereof, respectively, upon axial shifting movements of said pressure plate in directions towards and away from said friction elements, and means for shifting said pressure plate, the means for shifting said pressure plate in one direction comprising an axially shiftable member connected to said pressure plate and slidably mounted on one of said relatively rotatable members, a pivotal member disposed about said axially shiftable member, anti-friction bearing means interposed between said last-mentioned members for shifting the axially shiftable member responsive to pivotal movements of said pivotal member, said anti-friction bearing means comprising an inner race carried by said axially shiftable member, an outer race carried by said pivotal member, and a plurality of rollers disposed intermediate said inner and outer races, the means for imparting pivotal movements to said pivotal member comprises a rotatable shaft adapted to be mounted in a stationary support and having an eccentric connection with said pivotal member, an operating element connected to said shaft for rocking the same, and resilient means connected with said operating member and adapted to be connected with said stationary support for biasing said operating element in one direction, and means for imparting pivotal movements to said pivotal member.

5. In a device of the class described, the combination with a friction clutch having a shiftable member adapted to effect engagement and disengagement of said clutch upon shifting movements thereof in opposite directions, of means for shifting said shiftable member, wherein said means comprises an axially shiftable release element connected to said member, an anti-friction bearing encircling said release element and having a part fixedly mounted thereon, a collar encircling said bearing and mounted at one of its sides on a fixed pivot, said bearing also having a part mounted in said collar and the bearing further including a plurality of rollers interposed between said bearing parts, the opposing faces of said bearing parts being disposed at an angle to the axis of the release element and being longitudinally arched in opposite directions, said rollers being arched complementary to the opposed faces of the bearing parts aforesaid, and means at the other side of said collar and in operative engagement therewith for shifting said collar on the fixed pivot to impart axial movement to said release element.

References Cited in the file of this patent

UNITED STATES PATENTS

| | | |
|---|---|---|
| 1,338,868 | Rice et al. | May 4, 1920 |
| 1,346,147 | Webster | July 13, 1920 |
| 1,978,814 | Myers | Oct. 30, 1934 |
| 2,066,344 | Gouldbaum et al. | Jan. 5, 1937 |
| 2,621,948 | Geddes et al. | Dec. 16, 1952 |
| 2,624,437 | Gardner | Jan. 6, 1953 |
| 2,631,707 | Wahlberg | Mar. 17, 1953 |

FOREIGN PATENTS

| | | |
|---|---|---|
| 400,905 | Germany | Aug. 23, 1924 |
| 761,185 | France | Jan. 3, 1934 |
| 531,046 | Great Britain | Dec. 27, 1940 |